US010009752B2

(12) United States Patent
Adams et al.

(10) Patent No.: US 10,009,752 B2
(45) Date of Patent: Jun. 26, 2018

(54) METHOD AND APPARATUS FOR LOW COST CELLULAR ROAMING

(75) Inventors: Neil Patrick Adams, Kitchener (CA); Michael Stephen Brown, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 298 days.

(21) Appl. No.: 12/803,531

(22) Filed: Jun. 29, 2010

(65) Prior Publication Data

US 2011/0319074 A1    Dec. 29, 2011

(51) Int. Cl.
| | |
|---|---|
| H04W 4/00 | (2018.01) |
| H04W 8/18 | (2009.01) |
| H04M 1/725 | (2006.01) |
| H04W 8/06 | (2009.01) |

(52) U.S. Cl.
CPC .......... H04W 8/18 (2013.01); *H04M 1/72583* (2013.01); *H04W 8/06* (2013.01)

(58) Field of Classification Search
CPC ...................................................... H04W 8/18
USPC ................... 455/432.1, 552.1, 422.1; 725/25
See application file for complete search history.

(56) References Cited

U.S. PATENT DOCUMENTS

| | | | | |
|---|---|---|---|---|
| 5,422,989 | A * | 6/1995 | Bell et al. ...................... 345/689 |
| 5,634,196 | A * | 5/1997 | Alford ............................. 455/18 |
| 5,966,667 | A * | 10/1999 | Halloran et al. ............ 455/552.1 |
| 6,201,963 | B1 * | 3/2001 | Nakamura .................. 455/432.1 |
| 7,050,611 | B2 * | 5/2006 | Bodicker et al. ............. 382/128 |
| 7,099,664 | B1 * | 8/2006 | Hurst .............................. 455/428 |
| 7,676,823 | B2 * | 3/2010 | Acharya et al. ................. 725/37 |
| 2003/0207683 | A1 * | 11/2003 | Lempio ............. H04M 1/72572 455/422.1 |
| 2007/0300252 | A1 * | 12/2007 | Acharya et al. ................. 725/25 |
| 2009/0098870 | A1 * | 4/2009 | Vellanki et al. ............. 455/432.1 |
| 2009/0181651 | A1 * | 7/2009 | Klassen ............ H04M 1/72547 455/414.1 |

(Continued)

OTHER PUBLICATIONS

Canadian Office Action from related Canadian Patent Application No. 2,744,116 dated Mar. 14, 2013; 3 pages.

(Continued)

*Primary Examiner* — Charles Shedrick
(74) *Attorney, Agent, or Firm* — Thomas Grzesik; Fleit Gibbons Gutman Bongini & Bianco P.L.

(57) ABSTRACT

A wireless device (WD) is associated with a preprogrammed user roaming setting and an automated adjustment algorithm stored in operative communication with the device. The algorithm is initiated and run when the device enters a roaming area, thereby automatically activating the roaming setting. A user response query is operatively connected to the automated adjustment algorithm, and operates as a switch for the automated adjustment algorithm, which initiates changing the user settings in accordance with the roaming setting. A user available query is connected to the user response query, to determine if the wireless device is in use, and to generate a notification if the device is idle or a prompt if the device is in use. An output from the switch of the user response query selectively enables the automated adjustment algorithm responsive to at least one of a responsive and a nonresponsive input to the user response query.

9 Claims, 2 Drawing Sheets

(56) References Cited

U.S. PATENT DOCUMENTS

2009/0186630 A1    7/2009  Duff et al.

OTHER PUBLICATIONS

Canadian Office Action from related Canadian Patent Application No. 2,744,116 dated Jan. 9, 2014; 2 pages.
Canadian Office Action from related Canadian Patent Application No. 2,744,116 dated Feb. 9, 2015; 4 pages.
Canadian Office Action dated Oct. 18, 2016, received for Canadian Application No. 2,744,116.
http://www.pocketmax.net/images/stories/documents/pa_user.pdf; PhoneAlarm v3.x; User Guide; 39 pages, US.
Canadian Office Action dated Sep. 20, 2017, received for Canadian Application No. 2,744,116.
Response filed on Mar. 28, 2017 for Canadian Office Action dated Oct. 18, 2016, received for Canadian Application No. 2,744,116.

* cited by examiner

METHOD AND APPARATUS FOR LOW COST CELLULAR ROAMING

TECHNICAL FIELD

The present disclosure relates generally to a method and apparatus for low cost cellular roaming, and more particularly to a method and apparatus for providing a notification for selectively disabling certain preprogrammed wireless functions when roaming on a cellular network.

BACKGROUND

The market success of available multi-function wireless devices (WDs), such as mobile phones, computers, personal data assistants PDAs and the like, demonstrates the desirability of owning and operating devices having a wide array of available functions. Generally, consumers enter into subscriber agreements with service providers that offer a selection of services from a variety of functions for a WD, such as particular data services, text services, customized ringback features, and the like. Since each provider is unique, and offers services to subscribers within their provider coverage area, consumers are regularly faced with charges incurred for services when outside of a selected provider's coverage area, commonly known as "roaming charges".

When roaming with a WD, a subscriber of one wireless service provider uses the facilities of a second provider. Fees are determined by an agreement between the providers, and are usually first seen by a subscriber on an invoice, or as prepaid service minutes are depleted. Typically a subscriber does not choose the second, or roaming, provider. Most CDMA phones include a preferred roaming list, arranged by their provider, which determines priority access for a list of wireless carriers. The list can be arranged by a system ID, or SID, identifying each of the wireless carriers.

When a WD roams onto the second provider's network, the wireless fees are typically much higher than the fees charged for the same services by the selected provider network. Sometimes roaming can occur even when a subscriber is within the selected provider network. For example, when either a WD handset signal or the service provider's signal from the nearest antenna is very weak, automatic roaming can occur.

A WD can also go into "roaming mode" if there are a high number of calls in the area, such as when all of the provider's sites are at capacity or out of range. The WD might use another provider's site (i.e., might roam) instead of having a call blocked or dropped, sometimes at an additional cost to the subscriber.

Some WDs provide a symbol on the screen to indicate when the WD is roaming. Subscribers can manually disable certain functions of the WD, or can reduce or restrict a specific function, such as email capabilities or phone capabilities. For example, a cellular subscriber can be offered an option to preprogram their device to disable data services when a roaming area is entered. Specifically, for example, a Blackberry® subscriber, can preprogram their phone to disable all data services by accessing options→Mobile Network→Data Services: Off when roaming. However, since selecting this option prevents the use of all data services, it may not be desirable for some subscribers.

Alternatively, a number of different settings can be individually, manually disabled, such that not all of the data services are disabled simultaneously. Often the settings are all located in different locations within a user interface of the WD. However, individually and manually disabling settings can be both inefficient and costly to the subscriber, as the effort required to manually disable each function could cause a subscriber to incur roaming charges while making changes to the settings, or choose not to disable certain features in the interest of time, thereby incurring charges that could be avoided if disabling the services weren't such a cumbersome task.

BRIEF DESCRIPTION OF THE DRAWINGS

Features of example implementations of the principles herein will become apparent from the description, the claims, and the accompanying drawings in which:

DETAILED DESCRIPTION

Figure 1:
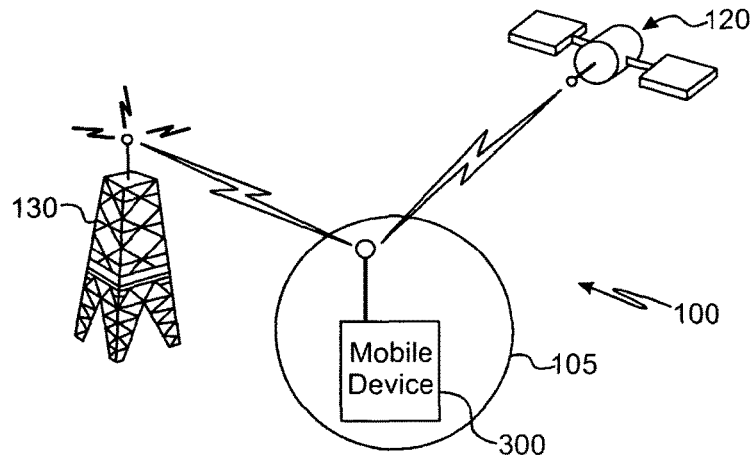
FIG. 1 illustrates an exemplary diagram of a wireless device, such as a cellphone, in communication with a communication network and a satellite.

One solution for automatically disabling selected data services upon entering a roaming location is discussed, for example, in commonly assigned US Patent Application number 20090186630 A1, the entire disclosure of which is incorporated herein by reference.

Since a WD can enter a roaming mode even within a subscriber service provider area and under a variety of circumstances, as discussed herein above, the automatic adjustment of preprogrammed user settings upon entering a roaming area, or defaulting to a roaming mode, may be disadvantageous.

For example, the user may be engaged in a task such as, for example, downloading, transmitting, or receiving data when a roaming area is entered. Given known configurations, the user is either unaware that the services will change, even though he may wish to abort the change in order to complete his task, or he can see a roaming symbol on a screen of the WD, but has no option to disable the automatic adjustment of the user roaming profile settings.

Therefore, in accordance with the principles herein, a wireless device (WD) having an associated, preprogrammed user roaming setting and an automated adjustment algorithm stored in operative communication with the device is provided. The algorithm is initiated and run upon a determination that the device enters a roaming area, thereby automatically activating the preprogrammed user roaming setting. The wireless device includes a user response query, operatively connected to the automated adjustment algorithm. The user response query operates as a switch for the automated adjustment algorithm, which initiates changing the user settings in accordance with the preprogrammed user roaming setting. A user available query is also provided. The user available query is connected to the user response query. The user available query determines if the wireless device is in use. The user available query then generates a notification if the device is idle, and a prompt if the device is in use. An output from a switch of the user response query selectively enables the automated adjustment algorithm responsive to at least one of a responsive and a nonresponsive input to the user response query.

Further, in accordance with the principles herein, a removable device adapted and constructed for selective operative connection to a wireless device WD is provided. An associated, preprogrammed user roaming setting and an automated adjustment algorithm are provided in operative communication with the removable device. The algorithm is initiated and run upon a determination that the device has entered a roaming area, thereby activating the preprogrammed roaming user setting. The removable device includes a user response query stored in the removable device and operatively connected to the automated adjustment algorithm. The user response query operates as a switch for the automated adjustment algorithm. A user available query is operatively connected to the user response query, the user available query determining if the wireless device is in use. The user available query can generate a notification if the device is idle and a prompt if the device is in use. An output from the switch of the user response query selectively enables the automated adjustment algorithm responsive to at least one of a responsive and a nonresponsive input to the user response query.

A method for selectively activating a preprogrammed roaming profile setting is also set forth. In a first step the method includes storing the preprogrammed roaming profile setting in operative communication with a wireless device (WD). Next, a notification that the device has entered a roaming area is provided. A query is generated for providing a response from the user to abort automated adjustment of user settings to the preprogrammed roaming profile setting. The automated adjustment of user settings to the preprogrammed roaming profile setting can then be aborted if a predetermined response is received.

In accordance with the principles herein, a switch can be provided for selectively disabling an automated adjustment algorithm of a wireless device that is activated when a roaming profile is initiated. The switch, as discussed herein can be selected to operate based either on a user response or nonresponse, as can be appreciated by those of skill in the art. Further, the switch can provide a response that the automated adjustment algorithm is to be disabled, or aborted, i.e., a stop response, or the switch can provide a response that the automated adjustment algorithm can proceed, i.e. a go ahead response.

As illustrated in FIG. 1, a suitable wireless, or mobile device 300 can be provided in a satellite network, shown generally at 100. The satellite network can include, for example, a satellite 120 and a communications network tower 130. A number of servers can be provided (not shown) in operative communication with the satellite communications network 100. Any suitable wireless device 300 can be provided. A suitable wireless device can include profile settings that can be selectively altered when entering a roaming area. A few examples of suitable devices include, but are not limited to, cell phones, wireless laptop computers, PDAs, and the like.

Figure 2:
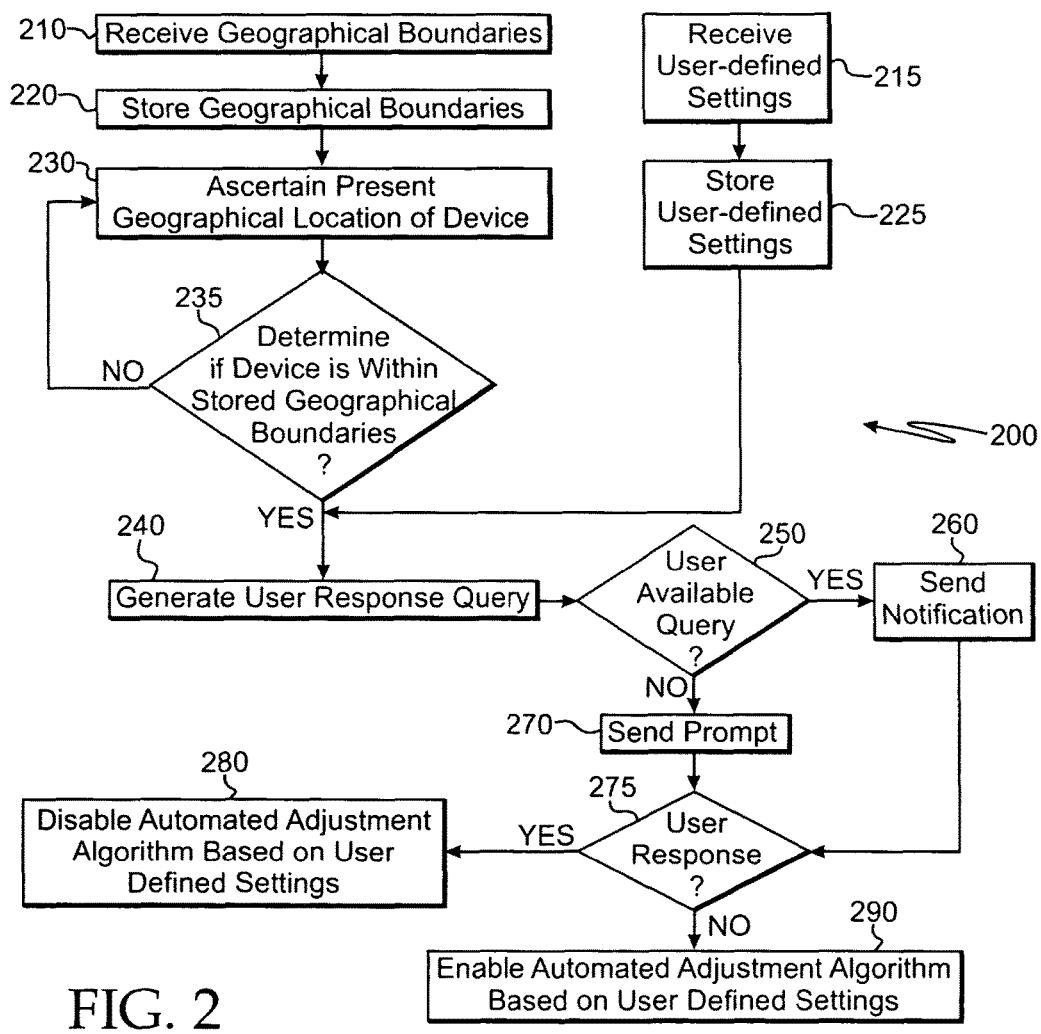
FIG. 2 illustrates a flow chart of an embodiment of a method for adjusting settings of the wireless device based on geographic location.

FIG. 2 is an exemplary embodiment shown generally at 200 of the principles described herein. A wireless device can receive geographical boundaries, at step 210. The determination of the relative position of the device can be made on a continual basis or at predetermined intervals as discussed, for example, in US 2009/0186630. The received boundaries can then be stored in the wireless device, as illustrated at 220, or can be utilized immediately by an automated adjustment algorithm, or other suitable algorithm provided in operative communication with the wireless device, to ascertain the geographical location of the device, such as at step 230. Next, a determination is made, by a suitable algorithm, as to whether the wireless device is within stored geographical boundaries at step 235.

If the wireless device is within the stored geographical boundaries then, in accordance with the principles herein, a user response query is generated at step 240. The user response query 240 can initiate a user available query 250 that determines whether or not the wireless device is idle or can simply notify the user that a roaming area has been entered. The user available query 250 could prevent a call from being interrupted or other types of disruption while using the device. Thus, the user available query 250, though not required, could prevent device use interruption of the wireless device.

To this end, the user available query 250 can provide a notification, such as an audible beep, ringtone, vibration, or other audible alert, or any other suitable notification, at step 260 if the wireless device is idle. Alternatively, a suitable prompt can be provided at step 270, such as a vibration, voice prompt, screen display, or other suitable prompt, where the user available query at step 250 determines that the device is in use. If the user then provides a response to the query as shown, for example, at step 275, then the automated adjustment algorithm associated with the device can be disabled, as shown at step 280. A nonresponse can cause the automated adjustment algorithm to be enabled, as shown at step 290. Alternatively, a response can be selected to enable the automated adjustment algorithm and a nonresponse can be selected to disable the automated adjustment algorithm. The notification and/or prompt can also be provided through a secondary device, such as an operatively connected peripheral device.

Figure 3:
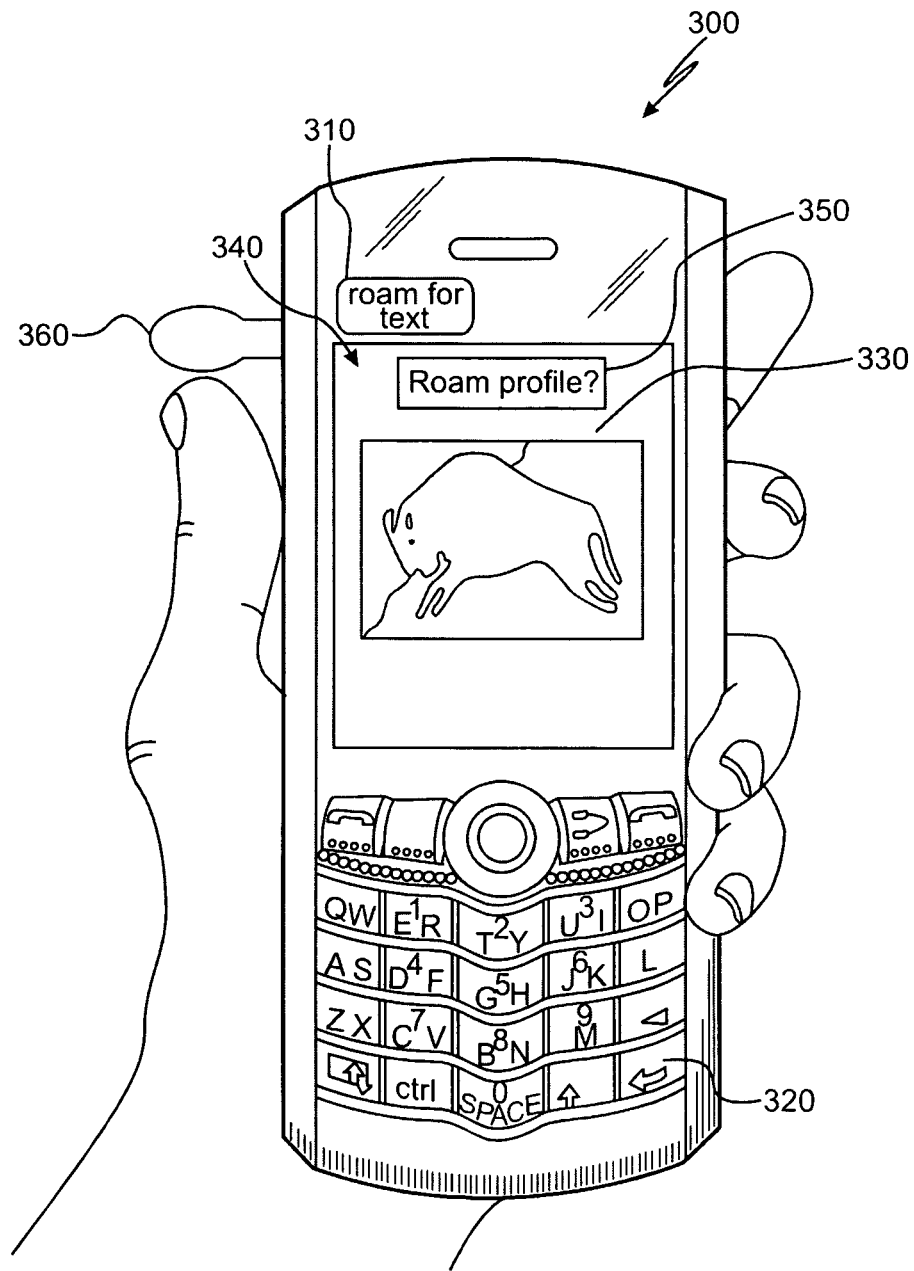
FIG. 3 illustrates a wireless device equipped with a number of alternative embodiments for selectively disabling an automated adjustment algorithm associated with the wireless device.

As illustrated in FIG. 3, a number of alternative features can be provided for selectively inputting a response to the user response query thereby selectively disabling or enabling the automated adjustment algorithm in accordance with the principles herein. For example, a button 310 can be provided on the wireless device, shown generally at 300. Any suitable wireless device 300 can be provided, such as a mobile phone, pda, wireless device adapted to send and/or receive text messages, or any other suitable device. Any suitable button can be provided in any suitable location on the wireless device 300. Preferably, the button 310 is located in an easy to locate and easy to view location on the wireless device 300.

The button 310 can include suitable indicia. Further, the indicia can be backlit when roaming is detected. Another suitable feature for selectively disabling roaming on the device can include designating a key, already incorporated into an existing wireless device 300 design, such as a key 320. In this case, a shift function can permit access to the key function for selectively disabling the roaming profile. To this end, indicia can be provided on the key, and can be selectively backlit if desired, to enhance the visibility of the key.

Another suitable embodiment can include, for example, an icon, such as icon 330 provided on a display screen, or interface display screen 340 of the wireless device 300. The icon 330 can be responsive to a touch input from the user, for example. Yet another embodiment can include a dialog box 350 provided on the display screen 340. The dialog box can be illuminated upon entering a roaming area, if desired.

In yet another alternative, the switch can be voice-activated, and the notification can be an audible alert or cue, such as, for example, a beep, ringbone, vibration, or other suitable audio signal.

In still another embodiment, a removable device 360, such as a USB adaptable device, can be provided for selectively connecting a self-executing algorithm capable of selectively disabling the automated adjustment algorithm in accordance with the principles here. The removable device can incorporate or activate features set forth hereinabove in connection with the wireless device. For example, the removable device can work in operative connection with the network to initiate notifications, receive audio responses, detect geographical location, or provide other functions in accordance with the principles herein to enable the selective disabling of the automated adjustment algorithm in accordance with a user response.

In accordance with the principles herein, it is desirable for a user to be able to program a wireless handheld communication device to adjust the settings of the handheld mobile communication device based on its geographic location. Exemplary embodiments of the wireless device 300 and associated components and communication with the satellite 120 are illustrated, for example, in FIG. 1.

In a preferred embodiment, one or more user device settings are adjusted based upon the geographical location of the device. Data regarding a user defined operating area or zone 105 can be stored on the device. This data can be received via a wireless communication network, such as a communications tower 130, as shown in FIG. 1. However, it is also possible that the data for the user-defined zone 105 is received while the device 300 is connected to a cradle. The data for the user-defined zone 105 can also be programmed directly into the device 300 by a user. This data preferably defines a set of geographical boundaries within which device setting adjustment is desired. This data delimiting the geographical boundaries is preferably defined in terms of coordinates. Other data may be used to define the geographical boundaries as is desired in order to effectively process the data received by the handheld 300 from a positioning system. Preferably, the position is determined via satellite data, but the position can also be determined using data received from the communication network tower 130 upon which the device 300 is operating. For example, the position of the device could be determined using a triangulation method based upon signals received from cell towers. Additionally, the location of the device could be done more generally such that if the device is outside the area of network coverage, its position is determined based upon a roaming indicator signal.

A user of the device can store data defining the geographical boundaries of the user-defined area using current position information on the device. This enables a user to walk or otherwise move about the periphery of around the premises or area to define the boundary of the user-defined zone. As the user walks the perimeter, boundary location coordinates can be generated using the device. These boundary coordinates can be later used to define the geographical boundary of the stored user defined area. The boundary location coordinates are obtained by positioning or holding the handheld device at a particular location proximate to the geographical boundary and defining the location as a set of coordinates (or other location data) as part of the saved data. The user can store multiple locations to create a "fence" using the user-defined areas. Alternatively, the geographical locations can be used to define entry points to a building or premises. Once the position of the device 300 has been determined, its location in relation to the geographical boundaries of the user defined operating area 105 is determined. As shown in FIG. 1, the device 300 is located within a user-defined zone 105. In a preferred embodiment, a geo-location based signal receiver is implemented to receive satellite-based information that defines a present geographical position of the device 300 and a microprocessor determines if the device 300 is located in the user defined area 105 based on a comparison to geographical boundaries of the user defined area 105 stored in memory as discussed, for example with regard to FIG. 2 of US 2090186630. The information regarding the geo-location of the device 300 may be processed by a specially designed circuit. The specially designed circuit may be implemented within, for example, a microprocessor. Then, this data is used by the microprocessor to determine the location of the device 300 with respect to the user defined area/zone 105. The determination of the relative position of the device 300 can be made on a continuous basis or at predefined intervals in order to optimize battery life of the device 300. While the device 300 is located within the user-defined area 105, the microprocessor adjusts the settings of the wireless handheld device 300 based on the user's programmed information.

As illustrated in FIG. 2, the geographical boundaries are received (block 210) and stored (block 220). The user-defined settings to be adjusted are received (block 215) and stored (block 225). Next, the present geographical position/location of the device 300 is ascertained using satellite-derived information (block 230). Then a determination is made whether the device 300 is located within the stored geographical boundaries (block 235). If it has been determined that the device 300 is within one of the stored geographical boundaries, then the appropriate subsystem or functional aspect user defined settings are adjusted (block 290) if the user does not disable the automated adjustment algorithm based on a user defined setting (block 280). However, if the device 300 is not within the stored geographical boundary the present location of the device 300 is monitored. Likewise once the user-defined setting has been adjusted on the device 300, the position of the device is evaluated to determine when the device has left the user defined area. The user-defined settings to be adjusted can be one of the above settings. The geographical as well as user defined settings can be predetermined (prerecorded) or transmitted to the device 300 using one of the systems described herein. These actions include, for example, e-mail filter settings, wireless transmission settings, user profile settings, and the like.

As depicted in FIG. 1, the device 300 is capable of receiving data transmitted via satellite 120 to determine geo-location. The satellite 120 is preferably a GPS satellite, yet in other embodiments the satellite 120 can be another type of satellite, such as a GLONASS (Global Orbiting Navigation Satellite System) satellite, equipped to transmit data to a receiver for determination of position information. The data transmitted by the satellite 120 relates to time information, which can be used by a processor of a receiving wireless device 300 to determine position. In order to obtain an accurate geo-location determination, data from four different satellites is preferred while geo-location information can be obtained if only three satellites are able to transmit data. Other geo-location systems may use a similar or different satellite configuration requirement than the GPS system. One skilled in the art would be able to make the necessary adaptations to allow the device 300 to function with the appropriate satellite system. Additionally, other variants of GPS such as differential GPS and WAAS (Wide Area Augmentation System) allow for greater accuracy in geo-location determination through the use of additional data. The determination of the geo-location of the device can be made using a specially designed processor for position determination. This specially designed processor may be incorporated into the wireless device 300.

Additionally, the geo-location of a handheld communication device 300 can be determined by using the wireless network tower 130. If the device 300 is in an area of coverage such that three transmitters of the wireless network can communicate with the device 300, a triangulation method of device location may be implemented. One or two cell towers can also be used to obtain the location information. Other techniques for locating the handheld communication device 300 using communication network transmissions for geo-location determination of the device are also considered within the scope of this disclosure and are easily appreciated by those persons skilled in these arts.

When the handheld electronic communication device 300 enters a stored user defined area, user defined email settings can be implemented. For example, when a user enters a home zone area, the user may wish to allow only specific types of email messages to be received by the handheld electronic communication device 300. The user may wish to only receive messages that have an urgent priority associated therewith. The urgent priority can be denoted using a flag or similar indicator. Additionally, the user may desire to receive a predetermined number of characters of the email message to determine whether the user wishes to receive additional data associated with the email message. The predetermined number of characters is preferably enough characters to allow the user to determine the meaning of the message. In at least one embodiment, the predetermined number of characters is 200. In another embodiment, the predetermined number of characters is between 150 and 350 characters. Furthermore, the user may wish to selectively prohibit the downloading of all email messages when the handheld electronic communication device 300 is located within the home zone area, and can in accordance with the principles herein.

When the handheld electronic communication device 300 is located within a defined meeting area, such as a conference room or specific building location, the user may wish to adapt the handling of email messages. For example, when a user enters a meeting area, the user may wish to allow only specific types of email messages to be received by the handheld electronic communication device 300. The user may wish to only receive messages that have an urgent priority associated therewith. Additionally, the user may desire to receive a predetermined number of characters of the email message to determine whether the user wishes to receive additional data associated with the email message. Furthermore, the user may wish to selectively prohibit the downloading of all email messages when the handheld electronic communication 300 is located within the meeting area, in accordance with the principles herein. In at least one embodiment, the meeting area can be defined using an administrative policy, such that employees of a company receive the restrictions automatically. The administrative policy can be implemented upon a given user, a group of users, or across the entire company. The administrative policy can include both location specific data as well as data relating to the user defined email settings.

In addition to the meeting and home zone areas as described above other areas can be used according to the above-described embodiments. For example the other locations that a user or administrator may define include areas associated with an office, restaurants, homes of social acquaintances, and other areas. The handheld electronic communication device 300 may store these areas locally as described above.

In addition to the user defined locations as described above, the email settings may be selectively adjusted based upon whether the handheld electronic communication device 300 is located a zone in which roaming charges apply. The determination of whether the handheld electronic communication device 300 is located within the roaming zone can be based upon a geo-location signal or using a signal transmitted from the wireless network 130 to the handheld electronic communication device 300. Once the signal indicative of the location of the whether the handheld electronic communication device 300 is within a roaming zone, the user email setting can be selectively modified to only receive messages that have an urgent priority associated therewith. In at least another embodiment, a predetermined number of characters of the email message can be selectively downloaded to the handheld electronic communication device 300. Furthermore, prohibiting the downloading of all email messages may be selectively implemented.

Exemplary embodiments have been described hereinabove regarding both handheld electronic communication devices 300 as well as the communication networks 130 within which they operate. Various modifications to and departures from the disclosed embodiments will occur to those having skill in the art. The steps or operations described herein are exemplary. There may be many variations to these steps or operations without departing from the spirit of the invention. For instance, the steps may be performed in a differing order, or steps may be added, deleted, or modified.

The embodiments described herein are also exemplary. Thus it will be appreciated that although the embodiments are described in terms of specific technologies, other technologies could be used to implement systems in keeping with the spirit of the present invention.

Although various implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A wireless device comprising:
   a memory having a plurality of roaming profile settings stored therein, wherein each roaming profile setting in the plurality of roaming settings restricts one or more features of the wireless device during a roaming mode of operation of the wireless device on a roaming provider network;
   a processor operably coupled to the memory and configured to
      determine when the wireless device is actively roaming on a roaming provider network;
      determine that a particular one of the plurality of roaming profile settings is to be automatically enabled in response to determining the wireless device is actively roaming on a roaming provider network; and
      in response to determining that a particular one of the plurality of roaming profile settings is to be automatically enabled, automatically present, for only a limited period of time while the wireless device is actively roaming on the roaming provider network, a user opportunity to disable automatic enablement of the particular one of the roaming profile settings while the wireless device is actively roaming on the roaming provider network, wherein disablement of the automatic enablement of the particular one of the roaming profile settings prevents the one or more features from being restricted while the wireless device is actively roaming on the roaming provider network.

2. The wireless device of claim 1 wherein at least some of the plurality of roaming profile settings comprise user settings.

3. The wireless device of claim 1 further comprising at least one button and wherein the user opportunity includes an opportunity for the user to employ the at least one button to signal a user desire regarding automatic use of the particular one of the roaming profile settings.

4. The wireless device of claim 1 further comprising at least one user-interface display screen and wherein the user opportunity includes an opportunity for the user to employ a touch-responsive icon as displayed on the user-interface display screen to signal a user desire regarding automatic use of the particular one of the roaming profile settings.

5. The wireless device of claim 1 wherein the processor is further configured to:

respond in a first way with respect to automatic use of the particular one of the roaming profile settings when a user responds to the user opportunity; and respond in a second way when the user does not respond to the user opportunity within the limited period of time.

6. The wireless device of claim 5 wherein the second way is different than the first way.

7. The wireless device of claim 1 wherein the processor is further configured to:

automatically determine whether the wireless device is presently idle or is being operated by the user in order to determine whether to supplement the user opportunity with a user notification.

8. The wireless device of claim 1 wherein the particular one of the roaming profile setting is automatically enabled by an automated adjustment algorithm in response to the roaming mode of operation, and wherein disablement of the automatic use of the particular one of the roaming profile setting comprises disabling the automated adjustment algorithm.

9. The wireless device of claim 7 wherein the processor is further configured to determine whether the wireless device is presently idle or is being operated by the user in response to determining that the wireless device is actively roaming on the roaming provider network.

* * * * *